United States Patent [19]

Davis

[11] Patent Number: 4,676,895

[45] Date of Patent: Jun. 30, 1987

[54] FLUID FLOW BAFFLE FOR FUEL PROCESSOR

[75] Inventor: Leland L. Davis, Saline, Mich.

[73] Assignee: Davco Manufacturing Corp., Ann Arbor, Mich.

[21] Appl. No.: 769,567

[22] Filed: Aug. 26, 1985

Related U.S. Application Data

[63] Continuation-in-part of Ser. No. 624,413, Jun. 25, 1984.

[51] Int. Cl.$^4$ ............................................. B01D 35/18
[52] U.S. Cl. ...................................... 210/184; 210/304
[58] Field of Search ................................ 210/184, 304

[56] References Cited

U.S. PATENT DOCUMENTS

| | | | |
|---|---|---|---|
| 2,294,107 | 8/1942 | Beck | 210/184 |
| 3,568,835 | 3/1971 | Hansen | 210/115 |
| 3,762,467 | 10/1973 | Poon | 210/184 |
| 3,883,428 | 5/1975 | Waring | 210/94 |
| 4,091,265 | 5/1978 | Richards | 210/184 |
| 4,298,465 | 11/1981 | Dauffel | 210/304 |
| 4,389,310 | 6/1983 | Seki et al. | 210/184 |
| 4,476,028 | 10/1984 | Harris | 210/184 |

*Primary Examiner*—Frank Spear
*Attorney, Agent, or Firm*—Harness, Dickey & Pierce

[57] ABSTRACT

A fluid flow baffle for fuel processors is described particularly adapted for fuel processors of the type having closely adjacent inlet and outlet flow ports. The fluid flow baffle separates incoming fuel from treated fuel to prevent contamination of the fuel processor's filter device by heavy contaminants and water entrained within the incoming fuel. The baffle further improves the thermal efficiency of the fuel processor device by acting as an insulating barrier and by providing optimal flow patterns for the incoming and heated fuel. Several embodiments of the fuel flow baffle are described, one adapted for one type of fuel processor in which fuel flows through the filter element in a radially inward direction. Another embodiment relates to a baffle intended for use in another type of fuel processor having a fuel flow direction in a radially outward direction.

19 Claims, 6 Drawing Figures

FLUID FLOW BAFFLE FOR FUEL PROCESSOR

CROSS REFERENCE TO RELATED APPLICATIONS

This application is a continuation-in-part of copending patent application Ser. No. 624,413 filed June 25, 1984 entitled "Filter Block Mounted Fuel Processor Apparatus."

BACKGROUND AND SUMMARY OF THE INVENTION

This invention relates to an improved fuel processor device and particularly a baffle particularly suited for fuel processor devices having closely adjacent fuel inlet and outlet ports.

In the past, when diesel fuel and other hydrocarbon fuels were plentiful and comparatively inexpensive, there were relatively few problems with the quality of fuel. Refineries, distributors, and retailers were careful to keep water out of fuel, and they usually did not pump out the heavy settlings from the bottom of the storage tanks. In more recent times, however, fuel suppliers have been providing fuel with increased quantities of water and other contaminants. Also, in the past, kerosene and other fuels with lower paraffin formation (cloud) and pour points were blended with diesel fuel for cold weather use. Fuel allocations due to government regulations, fuel stock availability, refinery capacity and other factors have now made it almost impossible to continue this practice. The result of these developments has been a tendency toward lower quality fuel oils containing substantially more impurities such as water, waxes, paraffins, heavier compounds and particulates which can be very disruptive to the proper operation of fuel oil consuming devices such as diesel engines. Such impurities can cause fuel line stoppages when they accumulate, or due to freezing, when exposed to cold weather conditions.

In order to overcome the above-mentioned fuel quality problems, operators of diesel engine-powered equipment are incorporating fuel conditioning devices which serve as water separators, impurity filters, and fuel heaters. Several of such devices are described by my issued U.S. Pat. Nos. 4,368,716; 4,428,351; 4,395,996; 4,421,090; 4,495,069; and by my copending patent applications Ser. Nos. 573,292, filed Jan. 23, 1984; and 641,866, filed Aug. 17, 1984. These issued patents and applications are hereby incorporated by reference. Devices constructed according to the teachings of the above-mentioned issued patents and pending applications for patent provide excellent fuel heating, water separation, and filtration performance. These devices are, however, essentially stand-alone units which are mounted remotely from the engine or associated fuel consuming apparatus and therefore require dedicated mounting provisions, mounting hardware, and fuel conduit connection provisions. Due to the expense and time needed to install these devices, many operators of diesel engine-powered equipment avoid installing them and later experience problems related to fuel contamination and/or fuel flow stoppage after exposure to cold conditions.

Most motor vehicle diesel engines and other fuel oil consuming devices have a filter mounting block which accommodates a particulate filter. Existing particulate filters are generally of two types. One type is the so-called spin-on filter which employs an integral filter element inside a throw-away canister which is threaded onto a boss on the filter mounting block. Another type of filter is the cartridge type which employs an outer canister having an internal replaceable filter element. The cartridge type fuel filter device is normally held in position using a through bolt which engages a threaded bore within the filter mounting block.

In view of the need for fuel processors which provide excellent performance and which can be installed conveniently and inexpensively, I invented a family of fuel processing devices which may be interchanged for fuel filters since they can be mounted directly to conventional fuel filter mounting blocks. These devices are described in my copending patent application Ser. No. 624,413, filed June 25, 1984 (hereinafter referred to as the parent application), which is the parent application to this continuation-in-part application. The several embodiments described in the parent application relate to fuel processors having various mounting provisions, overall configurations, and numerous combinations of elements such as impurity sensors, drain valves, heaters, etc. These fuel processors, by virtue of being designed to mount to existing filter mounting blocks, have fuel inlet and outlet ports within the upper end of their canister housing. Without taking steps to control the flow of fuel within these types of fuel processors, filter contamination and poor thermal efficiency can result when the incoming fuel is permitted to directly contact the surface of the filter element before it is heated and water and other impurities are removed.

The present invention is related to an improvement in the form of a fluid flow baffle, particularly suited for fuel processors of the type described in the parent application which have closely adjacent fuel inlets and outlets. The fluid flow baffle according to this invention acts as a barrier to separate incoming fuel from fuel flowing out of the processor to thereby enhance performance and extend the operational lifespan of the processor filter element.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE DRAWINGS

Figure 1:
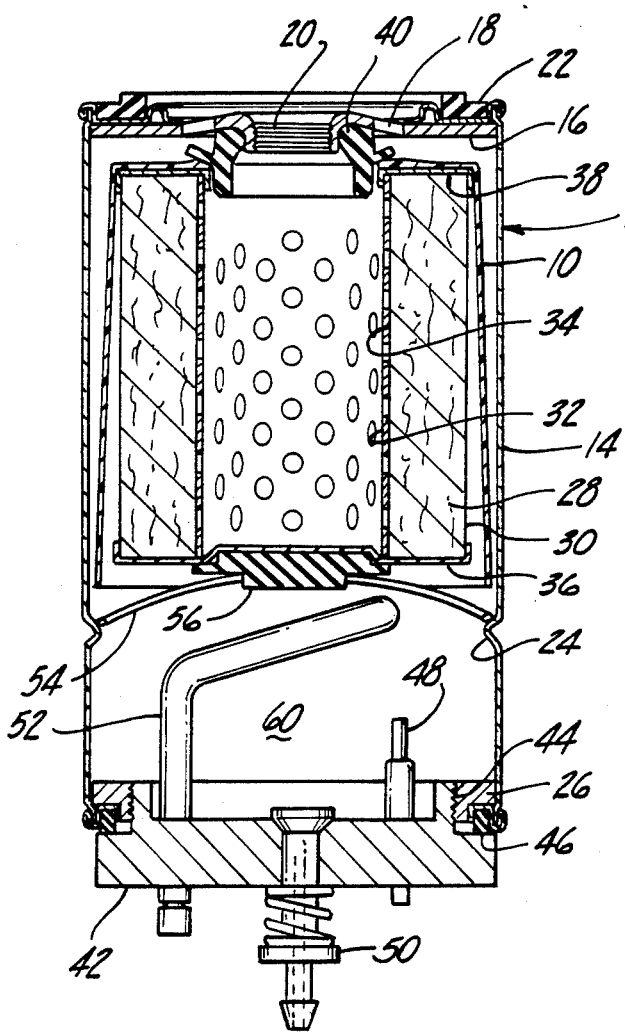
FIG. 1 is a cross-sectional view of a fuel processor device adapted for replacing a fuel filter and further showing a fluid flow baffle in accordance with a first embodiment of this invention.
Figure 2:
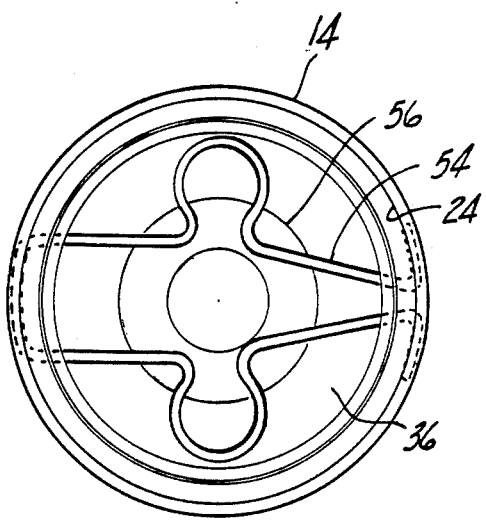
FIG. 2 is a bottom view of the fuel processor shown in FIG. 1 with certain components removed.
Figure 3:
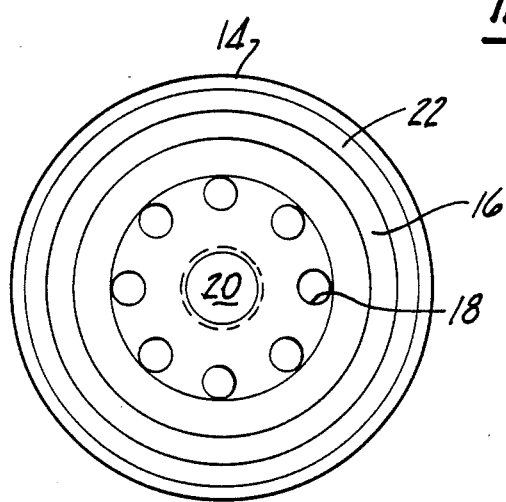
FIG. 3 is a top view of the fuel processor shown in FIG. 1.
Figure 4:
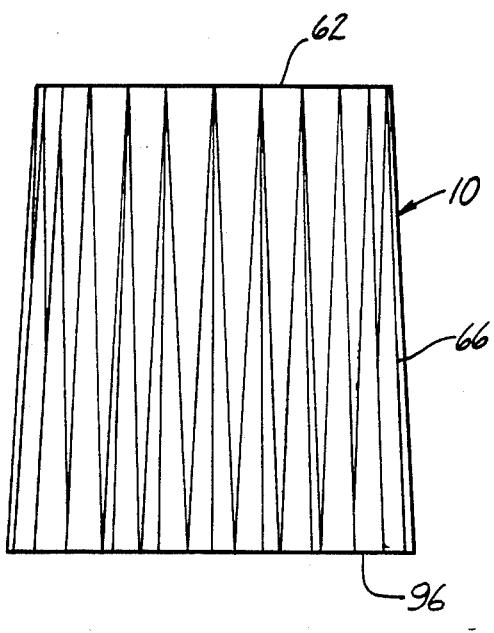
FIG. 4 is a side elevational view of the fluid flow baffle shown in FIG. 1 removed from the associated fuel processor.
Figure 5:
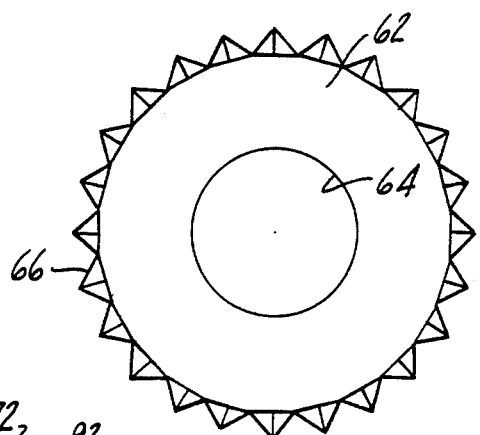
FIG. 5 is a bottom view of the fuel processor shown in FIG. 4.

In accordance with the present invention, fluid flow baffle 10 is shown incorporated into fuel processor 12 in FIG. 1, and is shown separately in FIGS. 4 and 5. Fuel processor 12, like the remainder of those described within the parent application, is adapted for replacing an existing fuel filter device. Fuel processor 12 is particularly designed to replace a throwaway type fuel filter and, for the sake of illustration purposes only, is generally similar to the fuel processor depicted in FIG. 12 of the parent patent application. Fuel processor 12, shown herein, differs principally from that shown in FIG. 12 of the parent application in that it does not require a through bolt for attaching the processor to the filter mounting pad and employs alternate means for supporting the filter element. Fuel processor 12 includes canister 14 having an upper plate 16 which defines a plurality of angularly spaced fuel inlet ports 18, and a central threaded fuel outlet port 20. Although canister 14 is shown having a cylindrical shape, it could be formed in any number of desired shapes, e.g. conical, square, prism, pyramidal, etc. Upper plate 16 and fuel inlet and outlet ports 18 and 20 are positioned to mate with the associated surfaces and structures of a filter mounting block (not shown) which would include a central hollow threaded boss. Upper seal 22 provides a fluidtight seal between fuel processor 12 and the associated filter mounting block. Canister 14 preferably defines a radially inwardly deformed rib 24 and has internally threaded ring 26 attached to the perimeter of its lower opened end.

Particulate filter element 28 is disposed within canister 14 and is a generally spool-shaped filter having a cylindrical outer surface 30 and a cylindrical inner surface 32, preferably defined by rigid perforated tube 34. Inner and outer surfaces 30 and 32 of filter 28 may, however, have any desired shape. The lower end of filter element 28 is enclosed by bottom plate 36, whereas the upper end has an opened center defined by top plate 38. Seal member 40 is provided which creates a fluidtight seal around the inside opening of top plate 38, so that fuel entering through fuel inlet ports 18 cannot flow directly to outlet port 20 thereby bypassing filter element 28. Particulate filter element 28 is held in position within canister 14 by formed wire retainer 54 which engages rib 24 and urges plug 56, and consequently filter element 28, into tight sealing engagement with seal member 40.

Lower plate 42 is provided having external threads 44 which mesh with the internal threads of lower plate 42, and a fluid seal is provided by element 46. As discussed in the parent patent application, a number of various elements can be provided within a lower plate structure. As shown by FIG. 1 for illustration purposes only, lower plate 42 includes water sensor 48, drain valve 50, and electrical resistance heater 52.

Fuel processor 12 operates generally as described by the parent patent application in that fuel enters through inlet ports 18 and flows downwardly into the lower chamber area 60 of canister 14 defined between particulate filter element 28 and lower plate 42. High density impurities and water are removed from the fuel as it passes into lower chamber area 60. If necessary, heater 52 is energized to elevate the temperature of the fuel within chamber area 60. Thereafter, fuel flows through particulate filter element 28 in a radially inward direction to the chamber defined within perforated tube 34 and exits processor 12 through fuel outlet port 20. Once particulate filter element 28 has become contaminated, it may be easily removed by detaching fuel processor 12 from the associated mounting structure and/or removing lower plate 42, enabling retainer 54 to be released and filter element 28 to be replaced.

In accordance with a principal feature of this invention, fluid flow baffle 10 is incorporated into fuel processor 12. Fluid flow baffle 10 is generally cup-shaped and has top 62 with a central port 64, and sides 66 preferably having a corrugated form. Baffle sides 66 are shaped to be positioned between filter 28 and canister 14. The corrugations of baffle 10 are formed along lines generally parallel to the longitudinal axis of the baffle. Baffle sides 66 may, however, have a number of other configurations such as a cylindrical or conical shape. Further, sides 66 could be corrugated in a different manner than that shown herein, for example, by providing different sizes and spacing of corrugations. Baffle 10 surrounds filter 28 and its lower edge 96 extends slightly below filter element lower plate 36 and defines an opened bottom end.

In order to facilitate production by molding processes, baffle sides 66 preferably have a slight taper or draft angle. Corrugating sides 66 of baffle 10, in addition to other advantages, enable the baffle to have a diameter at its lower edge 96 before it is installed which is greater than the inside diameter of canister 14. During installation, baffle 10 becomes radially compressed to firmly retain it in canister 14 and further positions the baffle away from direct contact with filter element 28 which may have a fragile outer surface 30.

Fluid flow baffle 10 is installed within fuel processor 12 as shown in FIG. 1 by trapping top 62 between filter element top plate 38 and seal member 40. When baffle 10 is installed within fuel processor 12, fuel flowing into the fuel processor from fuel inlets 18 flows downwardly along channels defined by the corrugations on the radially outer side surface of baffle 10. The fuel then flows into chamber area 60 where heavy particulates, water, and other high density impurities become separated from the fuel and settle out. Thereafter, fuel flows upwardly along channels defined by the inside corrugated surface of baffle 10 and then through particulate filter element 28. Baffle 10 prevents incoming fuel from directly contacting filter element 28 prior to its flow into lower chamber area 60. By preventing such direct contact, particulate matter and water entrained within the incoming fuel are kept from contaminating filter element 28, thereby extending its useful lifespan and reducing maintenance cost, downtime, and filter clogging. Absent baffle 10, water and impurities entrained within the incoming fuel would be rapidly absorbed by filter element 28, thereby reducing its filtration capacity and shortening its useful life. Absorption of water by filter element 28 further can lead to the development of a fuel impervious barrier or shell surrounding the filter when fuel processor 12 is exposed to cold ambient temperatures. Baffle 10 further enhances the water separating characteristics of the associated fuel processor by presenting a large surface area which acts to coalesce minute droplets of water suspended in the fuel. Large droplets of coalesced water forming on baffle 10 then drop to the bottom of housing 14 where it can be later eliminated by opening drain valve 50.

Baffle 10, in addition to extending the useful life of filter element 28, also enhances the thermal efficiency of fuel processor 12 when it is operating in a fuel heating mode. By providing baffle 10 in conjunction with heating element 52, direct contact between cold incoming fuel and filter media element 28 is prevented. Therefore, only warmed fuel directly contacts filter element 28, thereby aiding in the prevention of an accumulation of waxed fuel and ice from developing on the outer surface of the filter element which can cause fuel flow stoppage. Moreover, baffle 10 improves the thermal efficiency of fuel processor 12 by separating the cold incoming fuel from warmed fuel. As shown in FIG. 1, fuel which is warmed by heating element 52 rises vertically into the bottom end of baffle 10 defined by lower edge 96 and within the inside surface of baffle 10, thereby preventing the warmed fuel from losing heat due to contact with the side surfaces of canister 14 which may be cooled by the environment. Since the lower edge 96 of baffle 10 is completely opened, no resistance to the natural upward thermal flow of the heated fuel is imposed. This upward flow of fuel heats filter 28 and rises between the filter outer surface 30 and baffle 10 to melt any frozen accumulations in that area, thereby opening channels for fuel flow through filter 28. Baffle 10 enhances the thermal efficiency of fuel processor 12 in yet another manner. Baffle 10 and cold fuel flowing downwardly along the exterior surface of the baffle act as insulating layers which reduce heat loss by fuel warmed by heating element 52. Baffle 10 also provides a surface which is relatively "slippery" to accumulate solid masses of waxed fuel and ice such that these masses quickly separate from baffle 10 and fall to the lower portion of fuel processor 12 where they become heated and melted.

Figure 6:
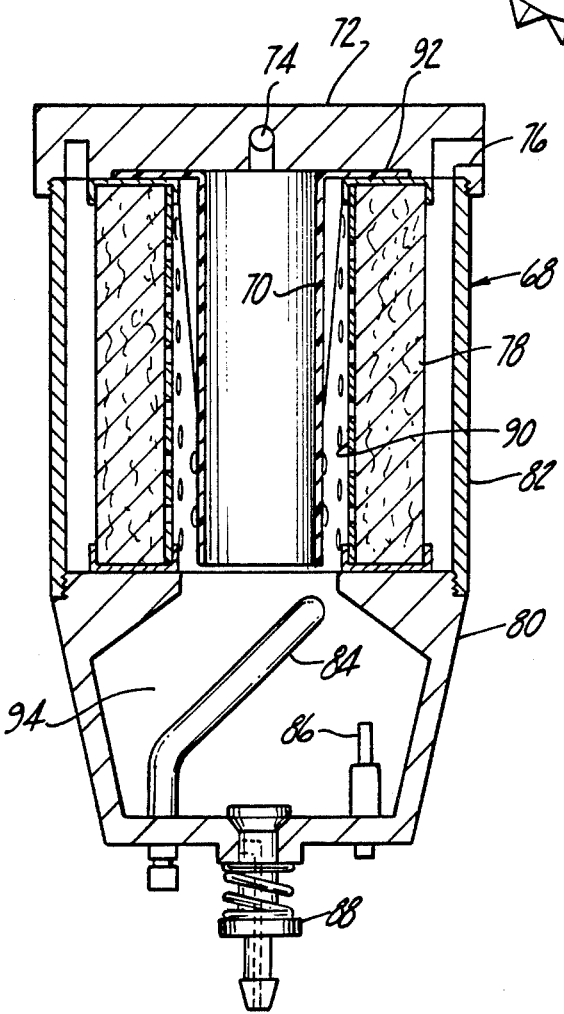
FIG. 6 is a cross-sectional view of a fuel processor device incorporating a fluid flow baffle in accordance with a second embodiment of this invention.

FIG. 6 illustrates an alternate embodiment of a fuel processor 68 and baffle 70 according to this invention. Fuel processor 68 incorporates a modified filter mounting heat 72 which provides a flow direction of fuel opposite to that previously described, i.e. fuel enters fuel processor 68 through a central inlet port 74 and exits through one or more radially outwardly positioned outlet ports 76. This placement of ports 74 and 76 provides a direction of fuel flow through filter element 78 from its center in a radially outer direction. Fuel processor 68 includes lower plate 80 which threadingly engages canister 82 and includes heater element 84, water sensor 86, and drain valve 88. Any means of attaching canister 82 to filter mounting head 72 can be employed such as threaded fasteners, etc. The embodiment of fuel processor 68 depicted in FIG. 6 further includes fluid flow baffle 70 which performs a function similar to that of baffle 10 in that it separates incoming fuel from fuel which has flowed into lower chamber area 94. Due to the opposite direction of fuel flow provided by fuel processor 68 as compared with the previously described embodiment, fuel flow baffle 70 is positioned within the cylindrical inside surface 90 of filter element 78. Baffle 70 includes a radially outwardly extending flange 92 which becomes clamped or otherwise sealed between filter mounting head 72 and filter element 78. Fuel flowing into inlet port 74 is prevented from direct contact with the inside surface of filter element 78 until it flows into lower chamber area 94 where water and heavy particulate matter become separated therefrom and the fuel becomes heated (if needed) by heater element 84. Once exposed to lower chamber area 94, fuel is permitted to flow along the outer surface of baffle 70 and penetrates filter element 74.

While the above description constitutes the preferred embodiments of the present invention, it will be appreciated that the invention is susceptible to modification, variation and change without departing from the proper scope and fair meaning of the accompanying claims.

What is claimed is:

1. A unitary fuel processing and filtering unit, particularly for diesel fuel and operative to separate out water and impurities from the fuel adapted to be mounted to a mounting head having a fuel inlet passage and a fuel outlet passage comprising: a housing including a lower portion defining a combined heating and sediment chamber, a concentric annular shaped filtering means positioned within an upper portion of said housing, a top plate having a fuel inlet and fuel outlet, a generally cup-shaped baffle having side surfaces which extend along said filtering means whereby fuel flowing into said fuel inlet passage flows downwardly along the radially outer surface of said baffle and into said heating and sediment chamber, said baffle further defining a passage for conducting fuel from said chamber to said filtering means, characterized by heating means in said lower portion operative to heat the incoming fuel by direct contact therewith in said chamber, said heating means including a heated portion in close proximity to said passage, and said heating means extending through a substantial part of said lower portion.

2. A unitary fuel processing and filtering unit according to claim 1 wherein said baffle side surfaces form radially outwardly disposed portions and radially inwardly disposed portions.

3. A unitary fuel processing and filtering unit according to claim 1 wherein said baffle defines a top surface with a central port.

4. A unitary fuel processing and filtering unit according to claim 1 wherein said baffle side surfaces have corrugations extending in a generally axial direction.

5. A unitary fuel processing and filtering unit according to claim 1 wherein said baffle side surfaces extend downwardly to a lower edge thereby defining an opened bottom of said baffle, said lower edge positioned below the bottom surface of said filtering means.

6. A unitary fuel processing and filtering unit according to claim 5 wherein said heater means is disposed in said housing such that it lies radially inwardly of said lower edge of said baffle whereby fuel heated by said heating means rises vertically into said baffle opened bottom to directly contact said filtering means thereby heating said filtering means.

7. A component for a unitary fuel processing and filtering unit according to claim 1 wherein said baffle further defines an upper radially projecting flange for mounting said baffle within said fuel processor.

8. The unitary fuel processing and filtering unit according to claim 1 wherein said top plate defines a central fuel outlet port and one or more angularly spaced fuel inlet ports and is adapted to be mounted to said mounting head, and said housing being connected to said top plate and defining threaded means at a lower opened end thereof, said fuel processing and filtering unit further comprising a seal element positioned between said top plate and said filtering means, filter mounting means within said housing engaging said housing and supporting said filtering means, and a lower plate removably attachable to said lower opened end of said housing and engageable with said threaded means thereof, said lower plate supporting said heating means and having a drain valve for draining water and impurities from said chamber.

9. A unitary fuel processing and filtering unit according to claim 8 wherein said filter mounting means comprising said housing having an inwardly formed rib and a retainer element which engages said housing rib and said filtering means.

10. A unitary fuel processing and filtering unit according to claim 8 further comprising impurity sensing means mounted to said lower plate.

11. A component for a unitary fuel processing and filtering unit, particularly for diesel fuel and operative to separate out water and impurities from the fuel adapted to be mounted to a mounting head having a fuel inlet passage and fuel outlet passage and further adapted to support heating means, said component comprising:
a housing having a lower portion defining a combined heating and sediment chamber, a concentric annular shaped filtering means positioned within an upper portion of said housing, a top plate having a fuel inlet and a fuel outlet, a generally cup-shaped baffle having side surfaces which extend along said filtering means whereby fuel flowing into said fuel inlet passage flows downwardly along the radially outer surface of said baffle and into said heating and sediment chamber, said baffle further defining a passage for conducting fuel from said chamber to said filtering means, means for mounting said heating means to said housing wherein said heating means is disposed in said chamber lower portion operative to heat the incoming fuel by direct contact therewith in said chamber, said heating means positioned in close proximity to said passage, and said heating means extending through a substantial part of said lower portion.

12. A component for a unitary fuel processing and filtering unit according to claim 11 wherein said baffle side surfaces form radially outwardly disposed portions and radially inwardly disposed portions.

13. A component for a unitary fuel processing and filtering unit according to claim 11 wherein said baffle defines a top surface with a central port.

14. A component for a unitary fuel processing and filtering unit according to claim 11 wherein said baffle side surfaces have corrugations extending in a generally axial direction.

15. A component for a unitary fuel processing and filtering unit according to claim 11 wherein said baffle axially extending side surfaces extend downwardly to a lower edge thereby defining an opened bottom of said baffle, said lower edge positioned below the bottom surface of said filtering means.

16. A component for a unitary fuel processing and filtering unit according to claim 15 wherein said heater means is disposed in said housing such that it lies radially inwardly of said lower edge of said baffle whereby fuel heated by said heater means rises vertically into said baffle opened bottom to directly contact with said filtering means thereby heating said filtering means.

17. A component for a unitary fuel processing and filtering unit according to claim 11 wherein said top plate defines a central fuel outlet port and one or more angularly spaced fuel inlet ports and is adapted to be mounted to said mounting head, and said housing being connected to said top plate and defining threaded means at a lower opened end thereof, said fuel processing and filtering unit further comprising a seal element positioned between said top plate and said filtering means, filter mounting means within said housing engaging said housing and supporting said filtering means, and a lower plate removably attachable to said lower opened end of said housing and engageable with said threaded means thereof, said lower plate supporting said heating means and having a drain valve for draining water and impurities from said chamber.

18. A component for a unitary fuel processing and filtering unit according to claim 17 wherein said filter mounting means comprising said housing having an inwardly formed rib and a retainer element which engages said housing rib and said filtering means.

19. A component for a unitary fuel processing and filtering unit according to claim 17 further comprising impurity sensing means mounted to said lower plate.

* * * * *

UNITED STATES PATENT AND TRADEMARK OFFICE
CERTIFICATE OF CORRECTION

PATENT NO. : 4,676,895

DATED : June 30, 1987

INVENTOR(S) : Leland L. Davis

It is certified that error appears in the above-identified patent and that said Letters Patent is hereby corrected as shown below:

Column 5, line 38, "heat" should read -- head --.

Signed and Sealed this

Fifteenth Day of March, 1988

Attest:

DONALD J. QUIGG

*Attesting Officer*     *Commissioner of Patents and Trademarks*